(12) United States Patent
Treichel

(10) Patent No.: US 6,695,353 B1
(45) Date of Patent: Feb. 24, 2004

(54) SEALED FITTING FOR USE WITH CORRUGATED TUBING

(75) Inventor: Steven A. Treichel, West Chester, PA (US)

(73) Assignee: Omega Flex, Inc., Westfield, MA (US)

( * ) Notice: Subject to any disclaimer, the term of this patent is extended or adjusted under 35 U.S.C. 154(b) by 0 days.

(21) Appl. No.: 09/707,389

(22) Filed: Nov. 7, 2000

(51) Int. Cl.[7] .................................................. E16L 17/06
(52) U.S. Cl. .......................... 285/23; 285/351; 285/353; 285/903
(58) Field of Search ................................. 285/322, 323, 285/23, 903, 353, 351

(56) References Cited

U.S. PATENT DOCUMENTS

| | | |
|---|---|---|
| 546,314 A | 9/1895 | Farrey |
| 1,298,303 A | 3/1919 | Dempsey |
| 2,458,874 A | 1/1949 | Parker |
| 3,008,738 A | 11/1961 | Longfellow |
| 3,552,781 A * | 1/1971 | Helland ..................... 285/322 |
| 4,302,036 A | 11/1981 | Burge |
| 4,630,850 A | 12/1986 | Saka |
| 4,674,775 A | 6/1987 | Tajima et al. |
| 4,893,846 A | 1/1990 | McGraw |
| 4,904,002 A | 2/1990 | Sasa et al. |
| 4,907,830 A | 3/1990 | Sasa et al. |
| 4,921,282 A * | 5/1990 | Meisinger .................... 285/104 |
| 5,292,156 A | 3/1994 | Sasa et al. |
| 5,423,578 A | 6/1995 | Kanomata et al. |
| 5,441,312 A | 8/1995 | Fujiyoshi et al. |
| 5,799,989 A | 9/1998 | Albino |
| 5,845,946 A * | 12/1998 | Thomas ..................... 285/348 |
| 6,036,237 A | 3/2000 | Sweeney |
| 6,079,749 A | 6/2000 | Albino et al. |
| 6,109,660 A * | 8/2000 | Akiyama et al. ............. 285/45 |

FOREIGN PATENT DOCUMENTS

SU 1742571 A1 6/1992

* cited by examiner

Primary Examiner—Lynne H. Browne
Assistant Examiner—Giovanna M Collins
(74) Attorney, Agent, or Firm—Cantor Colburn LLP

(57) ABSTRACT

A fitting for corrugated tubing has a body with an internal conduit therethrough and a centerline. The body further includes a distal end located on a first end of the body, the distal end having a first outer diameter and a cross sectional thickness. A channel is formed through an interior surface of the distal end, which channel extends circumferentially around the interior surface of the distal end. Thereby, a sealing material may be inserted into the channel, between the interior surface of the distal end and the internal conduit.

4 Claims, 1 Drawing Sheet

SEALED FITTING FOR USE WITH CORRUGATED TUBING

BACKGROUND OF THE INVENTION

The flexible gas piping (FGP) system, also referred to as corrugated stainless steel tubing (CSST) and formerly Interior Gas Piping (IGP) was developed in Japan and first introduced into that market by Osaka Gas and Tokyo Gas Companies during the early 1980's. The system utilizes stainless steel corrugated tubing supplied in rolls or coils with field attachable fittings to distribute gas from a central supply point such as the meter or regulator to the various appliances within a house or building. The technology, which has likened the process of plumbing a house for gas to wiring a house for electricity, substantially reduces installation time and hence the associated higher cost of labor. The technology was brought to the United States by the Gas Research Institute who saw it as a means of making gas installations more competitive; thereby increasing the percentage of new construction plumbed for gas and increasing the overall consumption of natural gas on a national basis. The technology was enthusiastically endorsed and supported by major gas utilities who had seen the significant higher cost of installed piping as their single greatest obstacle to selling more gas. Code acceptance required more time and effort to obtain, but the product is now recognized by all national model codes and ANSI, the National Fire Protection Association/National Fuel Gas Code and is tested and recognized by the American Gas Association. This product will eventually supplant black-iron pipe which accounts for approximately 80% of all fuel gas piping today, as well as copper tube which, while enjoying many of the same advantages of FGP, is being banned from this application at an increasing rate.

There have been three types of fittings originally put into the field. The first fitting introduced into the field used a fiber gasket to make the seal and no special tools were needed to assemble this fitting. This fitting has a higher incidence of leaks than the flared metal to metal seals used by other manufacturers.

The second fitting introduced into the field used first a specialized tool to flatten the convolutions at the end of the CSST tube where the fitting was to be attached and then a second tool was used to put a single flare on the tube end. This product is now off the market due to failures in the tubing caused by work hardening of the stainless steel in the flattening and flaring process.

The third type of fitting was introduced into the field using no special tools to make a metal to metal seal by folding the convolutions of the tube back on itself creating a double flare. After a limited time in the field it was realized that this fitting design was inconsistent in making a leak tight seal. The remedy to the problem was to design an insert type flaring tool; this was used for about three years. A second redesign was conducted, upgrading the insert tool to a socket type flaring tool.

A current problem in installing certain fittings is the number of loose parts that the installer must assemble in the field. In a typical fitting, there is a body, a nut, a gasket and two split ring washers that must be assembled to couple the fitting to the corrugated tubing. This number of parts leads to several disadvantages including complicated assembly and the need to carry extra parts to compensate for lost or damaged parts.

SUMMARY OF THE INVENTION

The above-discussed and other drawbacks and deficiencies of the prior art are overcome or alleviated by the fitting of the present invention. A fitting for corrugated tubing has a body with an internal conduit therethrough and a centerline. The body further includes a distal end located on a first end of the body, the distal end having a first outer diameter and a cross sectional thickness. A channel is formed through an interior surface of the distal end, which channel extends circumferentially around the interior surface of the distal end. Thereby, a sealing material may be inserted into the channel, between the interior surface of the distal end and the internal conduit.

Preferably, the channel is U-shaped and comprises a pair of opposing side walls, extending radially outward from the centerline and terminating in an end wall running coaxially with the centerline. The fitting also includes a second end of the body, having a second outer diameter which is less than the first outer diameter. The channel has a third outer diameter which is less than the second outer diameter.

The above-discussed and other features and advantages of the present invention will be appreciated and understood by those skilled in the art from the following detailed description and drawings.

BRIEF DESCRIPTION OF THE DRAWINGS

Referring now to the drawings wherein like elements are numbered alike in the several FIGURES.

DETAILED DESCRIPTION OF THE PREFERRED EMBODIMENTS

Figure 1:
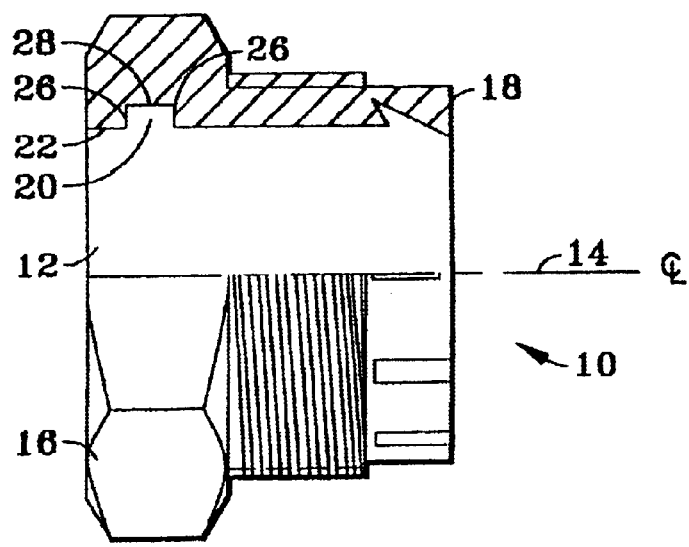
FIG. 1 is a side view, in partial cross-section, of the fitting according to the present invention.
Figure 2:
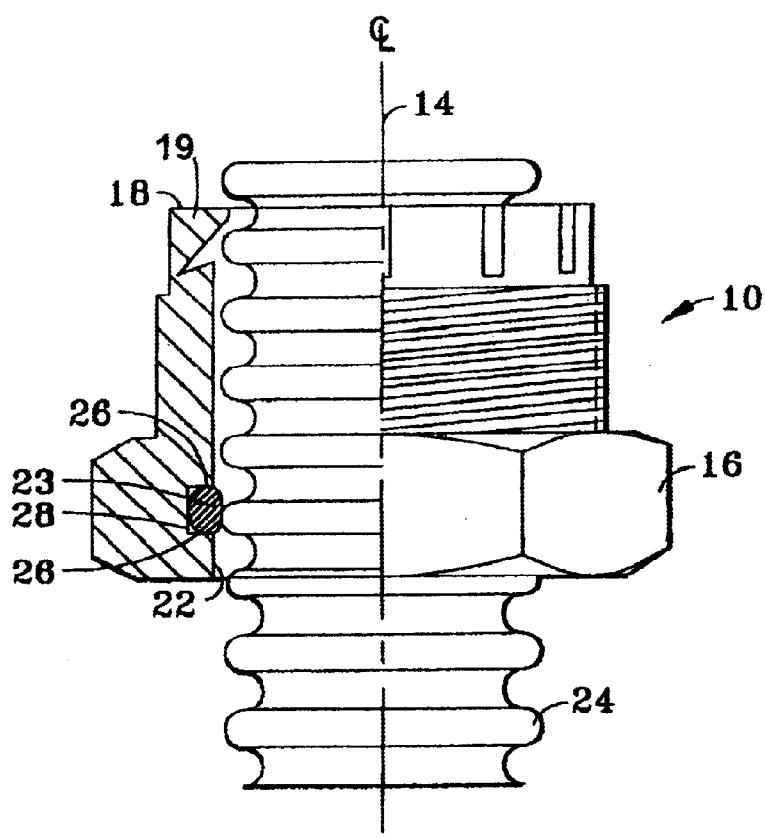
FIG. 2 is another view, in partial cross-section, of the fitting according to the present invention, with a length of corrugated tubing inserted therethrough.

The present invention is related to U.S. Pat. Nos. 5,799,989 and 6,079,749, the contents of which are incorporated herein by reference. Referring now to FIGS. 1 and 2, the fitting in a preferred embodiment is made up of a body 10 which has an internal conduit 12 running therethrough, defining a centerline 14. Located at a first end of the body is a distal end 16. Although the body 10 is generally cylindrically shaped, the distal end 16 has an outer diameter which exceeds that of the sealing end:18 of the body 10. The distal end 16 of body 10 also features a U-shaped channel 20 formed within an interior surface 22 of the distal end 16. The channel 20 extends circumferentially around the interior surface 22 of the distal end 16 and is designed to accommodate a sealing material 23 such as a joint compound, gasket or O-ring, thereby forming a tight seal between the internal conduit 12 and a length of corrugated tubing 24 depicted in FIG. 2.

In the preferred embodiment, the channel 20 includes a pair of opposing side walls 26 which extend radially outward from tile centerline 14 and terminate in an end wall which runs coaxially with the centerline. The channel 20 is also concentrically located and formed within the interior surface 22 of distal end 16. The sealing end 18 of body 10 has an outside diameter less than that of the diameter of the distal end 16. The outside diameter of the sealing end 18 is greater than the outside diameter defined by the channel 20. The channel 20 need not be formed at the distal end 16, but may be formed at any point along the interior surface 22 bordering conduit 12, so long as sealing material 23 does not interfere with securing the body 10 of the fitting to the tubing 24. Tubing 24 is preferably corrugated metal (e.g., stainless steel) tubing having peaks and valleys. At sealing end 18, a sealing member 19 is positioned in one of the valleys as shown in FIG. 2 and described in U.S. Pat. Nos. 5,799,989 and 6,079,749. In addition, the channel 20 may be formed in fittings other than that shown in FIGS. 1 and 2, such as the fittings disclosed in U.S. Pat. Nos. 5,799,989 and 6,079,749.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A fluid coupling comprising:

corrugated metal tubing having peaks and valleys;

a fitting coupled to said corrugated tubing, said fitting having a body having an internal conduit therethrough and a centerline;

said body having distal end located at a first end of said body, said distal end having a first outer diameter and a cross sectional thickness; and a U-shaped channel formed through an interior surface of said distal end, said channel extending circumferentially around said interior surface of said distal end, wherein said channel further comprises a pair of opposing side walls, extending radially outward from said centerline and terminating in an end wall running coaxially with said centerline;

a sealing material in said channel, between said interior surface of said distal end and said internal conduit;

said body having a sealing end located at a second end of said body, said sealing end having a sealing member positioned in one of said valleys of said corrugated metal tubing to foil a seal between said corrugated metal tubing and said fitting, said corrugated metal tubing entering said fitting at said distal end and terminating at said sealing end, said sealing material contacting the outside of said corrugated metal tubing at a location distanced from the sealing end;

wherein said second end of said body has a second outer diameter, said second outer diameter is less than said first outer diameter;

wherein said channel has a third outer diameter which is less than said second outer diameter.

2. The fluid coupling of claim 1 wherein said sealing material is a joint compound.

3. The fluid coupling of claim 1 wherein said sealing material is a gasket.

4. The fluid coupling of claim 1 wherein said sealing material is an o-ring.

* * * * *